US012465015B1

(12) United States Patent
Bates

(10) Patent No.: US 12,465,015 B1
(45) Date of Patent: Nov. 11, 2025

(54) FRESH PET FOOD DISPENSING TECHNIQUES

(71) Applicant: Hannah Bates, Brooklyn, NY (US)

(72) Inventor: Hannah Bates, Brooklyn, NY (US)

( * ) Notice: Subject to any disclaimer, the term of this patent is extended or adjusted under 35 U.S.C. 154(b) by 0 days.

(21) Appl. No.: 19/029,980

(22) Filed: Jan. 17, 2025

Related U.S. Application Data

(63) Continuation of application No. 18/817,945, filed on Aug. 28, 2024.

(51) Int. Cl.
*A01K 5/02* (2006.01)

(52) U.S. Cl.
CPC .................. *A01K 5/0291* (2013.01)

(58) Field of Classification Search
CPC ...... A01K 5/0291; A01K 5/02; A01K 5/0225; A01K 5/0233; A01K 5/0241; A01K 5/025; A01K 5/0258; A01K 5/0266; A01K 5/0275; A01K 5/0283; A01K 7/02
See application file for complete search history.

(56) References Cited

U.S. PATENT DOCUMENTS

| | | | | |
|---|---|---|---|---|
| 3,780,702 | A * | 12/1973 | Waterbury | A01K 5/02 119/51.13 |
| 5,129,361 | A * | 7/1992 | Deutsch | A01K 5/0291 119/51.5 |
| 9,567,126 | B2 * | 2/2017 | Wilson | A01K 5/0291 |
| 10,034,453 | B2 * | 7/2018 | Neighbors | A01K 5/0208 |
| 11,981,473 | B2 * | 5/2024 | Procyshyn | B25J 11/00 |
| 2015/0053138 | A1 * | 2/2015 | Ramsey | B65B 59/003 119/61.5 |
| 2017/0202178 | A1 * | 7/2017 | Gordon | A01K 5/007 |

(Continued)

FOREIGN PATENT DOCUMENTS

| | | | | |
|---|---|---|---|---|
| CN | 107041675 | A * | 8/2017 | ............. A47J 36/00 |
| CN | 109392747 | A * | 3/2019 | ......... A01K 39/0125 |

(Continued)

OTHER PUBLICATIONS

Bistro.cat, "BistroCat Feeder," available at https://getbistrocat.com/products/bistro-cat-feeder?variant=44381496377641, accessed on Sep. 18, 2024, 8 pages.

(Continued)

*Primary Examiner* — Ebony E Evans
(74) *Attorney, Agent, or Firm* — BECKMAN LAW P.C.; Christopher Beckman

(57) ABSTRACT

New forms of pet food feeding devices, capable of storing and dispensing new forms of pet food containing bowl-shaped pods, and methods for their use, are provided. A pet feeding device includes an elevated service area, at or about a mid-section of the pet food feeding device. Such bowl-shaped pods may include one or more inset plies of thin material, sealing wet pet food, and having a lateral slicing area, devoid of food below it. The bowl-shaped pods may include a proprietary form factor allowing the nesting of multiple pods. The service area may include one or more cradles configured to catch and drop the bowl-shaped pods. A sealed disposal tank may be provided, at or about a bottom of the pet food feeding device. The pet food feeding device may also include a control system including specialized computer hardware and software, creating settings for pet feeding schedules.

19 Claims, 6 Drawing Sheets

(56) References Cited

U.S. PATENT DOCUMENTS

| | | | |
|---|---|---|---|
| 2023/0240257 A1 | | 8/2023 | Zhang et al. |
| 2024/0081280 A1* | | 3/2024 | Franklin .............. A01K 5/0114 |
| 2024/0081283 A1 | | 3/2024 | Franklin et al. |

FOREIGN PATENT DOCUMENTS

| | | | | |
|---|---|---|---|---|
| CN | 219478862 U | | 8/2023 | |
| FR | 2501964 A1 | | 9/1982 | |
| FR | 2701353 A1 | * | 8/1994 | ........... A01K 5/0291 |
| KR | 20110038610 A | * | 4/2011 | .......... A47J 31/3642 |
| KR | 20230058802 A | * | 5/2023 | ........... A01K 5/0107 |
| WO | 2016088092 A1 | | 6/2016 | |
| WO | WO-2019211409 A1 | * | 11/2019 | ............. A23K 40/00 |
| WO | WO-2020169726 A1 | * | 8/2020 | ........... A01K 5/0114 |
| WO | WO-2023220752 A2 | * | 11/2023 | ........... A01K 5/0114 |

OTHER PUBLICATIONS

Petlibro, "Polar Wet Food Feeder," available at https://petlibro.com/products/polar-wet-food-pet-feeder, accessed May 21, 2024.

IPettie, "Donuts Frost 6 Meal Cordless Automatic Pet Feeder," available at https://www.ipettie.com/products/donuts-frost-6-meal-cordless-automatic-pet-feeder, accessed Sep. 30, 2024.

Catit, "Catit Pixi Smart 6-Meal Feeder," available at https://catit.us/products/catit-pixi-smart-6-meal-feeder, accessed Sep. 30, 2024.

Hackaday, "Automated Cat Feeder Handles Wet Food With Aplomb." available at https://hackaday.com/2019/03/22/auotmated-cat-feeder-handles-wet-food-with-aplomb/, accessed May 23, 2024.

Petmate, "GAMMA2 Nano Automated Pet Feeder," available at https://www.petmate.com/products/gamma2-nano-automated-pet-feeder?, accessed May 21, 2024.

Amazon.com, "Jumpfree Automatic Cat Feeder with APP Control," available at https://www.amazon.com/JUMPFREE-Automatic-Dispenser-Stainless-Detachable/dp/B0BQBK7HVG, accessed May 21, 2024.

"The History of Humankind Feeding Cats: From Hunters to Automated Feeders," available at https://www.aimicatcare.com/blogs/news/the-history-of-humankind-feeding-cats-from-hunters-to-automated-feeders, accessed May 21, 2024.

The Pet Historian, "Faced with an automatic pet feeder . . . . 1939," available at https://thepethistorian.com/2015/04/25/faced-with-an-automatic-pet-feeder-1939/, accessed May 21, 2024.

Wikipedia, "Domestication of the cat," available at https://en.wikipedia.org/wiki/Domestication_of_the_cat, accessed May 20, 2024.

Chewy.com, "Petsafe Eatwell 5-Meal Automatic Dog & Cat Feeder," available at https://www.chewy.com/petsafe-eatwell-5-meal-automatic-dog/dp/...112AGolhKUS_dFIXvYoL7OqdnKWs9of4ev3Cnu9sEZ45gmKoaAskWEALw_wcB, accessed Sep. 30, 2024.

\* cited by examiner

FRESH PET FOOD DISPENSING TECHNIQUES

CROSS-REFERENCE TO RELATED APPLICATION

This application is a continuation of U.S. patent application Ser. No. 18/817,945, titled "Fresh Pet Food Dispensing Techniques," filed Aug. 28, 2024, the entire contents of which are hereby incorporated by reference in their entirety as if fully set forth herein.

INTELLECTUAL PROPERTY NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Unless otherwise stated, all trademarks and trade dress disclosed in this patent document and other distinctive names, emblems, and designs associated with product or service descriptions, are subject to trademark rights. The trademark and trade dress owner also reserves all trademark rights whatsoever.

FIELD OF THE INVENTION

The present disclosures relate to new systems, devices and methods for dispensing fresh pet food and, more specifically, to such systems, devices and methods for implementing new forms of freshly opened food containers for domestic cats.

BACKGROUND

Humankind has taken in pet animals since before recorded history. Domestic cats originated from Near Eastern and Egyptian wildcats, beginning about 7,500 years ago. These wildcats were adopted as companion animals to humans gradually, coalescing around early agricultural civilizations. By 1,500 B.C.E., domestic cats were widespread, already numbering in the millions.

Similarly, dogs gradually became domesticated as companion animals to humans over thousands of years, descending from wolves and coevolving with early human civilizations. Through selective breeding, cats and dogs have become far less dangerous than their wild ancestors. Their wild traits have become less pronounced, and they are each now excellent human companions.

Cats, dogs and other pet animals require daily feeding and other care. A wide variety of pet foods are commercially available, ranging from dry, granular food (sometimes known as "kibble"), to semi-dry ("moist") food, wet food and treats. Commercial pet foods are available at a lower cost than human foods and are better tailored to particular pets' nutritional needs. However, quality is generally lower with pet food than the quality experienced with human foods and pet foods typically contain less healthy food sources and additives. Many pet owners (a.k.a., "pet parents") have even begun cooking for their pets, at least part of the time, in an effort to provide a healthier diet for them.

The need to regularly feed pets can present challenges, particularly when pet parents are travelling. Some pet parents hire a "pet sitter," or ask friends and family to continue feeding their pets at these times. Others may use automatic feeders.

Automatic pet feeders have been in use for many decades. For example, an automatic pet feeder named KENL-MASTR was marketed nationwide, at least as early as 1939. Automatic pet feeders are best suited for kibble, whether dry, or moist. Wet food is generally not particularly well-suited to automatic feeders, for a variety of reasons, including increased spoiling and mess. However, some pet feeders incorporate a plurality of chambers, typically, in a rotary arrangement, to present new food, through a top-facing service window.

Some variations of pet feeders include sections that allow for the use of ice packs or other refrigerants, to overcome the spoiling of wet food. For example, some such refrigerated automatic pet feeders are available from PETLIBRO and IPETI.

Dispensing systems have also been created which portion kibble in a continuous manner, over time, and even react to pets' eating habits, caloric needs, and remote input from owners (e.g., via a smartphone application ("App.")). Some automatic pet feeders incorporate live view camera subsystems, allowing owners to remotely observe their pet at feeding time, while travelling.

However, in the main, the structural design of pet feeders has remained essentially unchanged for many years. Long after introduction of rotary and ice-pack pet feeders, the most popular pet feeders remain a kibble dispensing design, typically including a kibble silo and a dispenser. There is a long-felt need for better pet feeders.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of this application's inventor's own discoveries and work and work results.

SUMMARY OF THE INVENTION

New systems, devices and methods are provided for implementing new forms of freshly-opened food containers for domestic pets. In some embodiments, such freshly opened food containers include moist and/or wet food, rather than kibble.

In some embodiments, systems according to the present invention include a new form of pet feeding device, capable of storing and dispensing one or more pet food containing bowl-shaped pods from a storage area, at least partially disposed in an upper section of the pet feeding device. In some such embodiments, such a pet feeding device drops a lower-most bowl-shaped pod of a storage stack of such bowl-shaped pods, at a meal time for a pet. And, in some such embodiments, such a lower-most bowl-shaped pod is dropped into a service area, which may be located in a lower section of the device, in some embodiments. However, in some alternative embodiments, such a service area is located in a mid-section of the pet feeding device.

The bowl-shaped pods, in some embodiments, are in a particular form related in some respects to a small service bowl used in dinnerware, but with form modifications and additional unique aspects in accordance with embodiments set forth in this application, as set forth in greater detail below. In some embodiments, the bowl-shaped pods are partially pre-filled with pet food in a lower, food-containing space of the bowl-shaped pods (e.g., at or about an internal bottom of the bowl-shaped pods). However, in various embodiments, the bowl-shaped pods may be filled to a greater or lesser extent, including pet food present in other space within the bowl-shaped pods, in such embodiments. In some such embodiments, the bowl-shaped pods are sealed with an air-tight top-seal. In some such embodiments, the air-tight top-seal may include one or more ply(ies) of material conforming to an upper surface of the pet food. Above the food and seal, in some embodiments, the bowl-shaped pods include a headspace. In some such embodiments, such a headspace of the bowl-shaped pods creates an internal form factor, enabling the bowl-shaped pods to nest with one another, even when filled with food, in the storage stack. In some embodiments, such a storage stack is maintained within a fresh bowl-shaped pod magazine, which may release pods within an upper section and/or a wall-facing section, of the pet feeding device.

In various embodiments, the pet feeding device opens the air-tight top-seal on the lower-most bowl-shaped pod, opening the bowl-shaped pod and providing access to the food, prior to dispensing it for food service by dropping it into the service area. As will be discussed in greater detail below, in some embodiments, each of the bowl-shaped pods includes one or more ply(ies) of thin metal, plastic, or another sliceable and or peelable sheet material as part of the air-tight top-seal, covering and sealing the lower, food-containing space of the bowl-shaped pods (a "food-sealing ply"). In some embodiments, such a material includes aluminum, or an aluminum alloy, such as those used in conventional canned foods. However, in some embodiments, such a food-sealing ply is thinner than conventional plies of aluminum and other alloys used in conventional canned pet foods. In some embodiments, such a material includes a recyclable material. In some embodiments, the device includes a pod opener including a blade slicing open the food-sealing ply. However, in some such embodiments, such a slicer creates a safe, blunt edge by cutting the ply, e.g., through methods known in the art for slicing cans while creating a safe edge where metal plies are sliced. However, in some methods, such a safe edge is created by other means known in the art, such as by a peeling device.

In some embodiments, the device then dispenses the now opened lower-most bowl-shaped pod into the service area, e.g., at or about a mid-section of the pet feeding device. In some embodiments, the food service area of the pet feeding device includes a rounded cradle, which catches and holds a bowl-shaped pod when dropped into it by the pet feeding device.

In some embodiments, after a pet finishes consuming food from an opened and dispensed bowl-shaped pod in the service area, the pet feeding device next disposes of the used bowl-shaped pod, into a pod collection and disposal tank or other disposal section of the pet feeding device. In some embodiments, such a pod collection and disposal tank is located in a lower section of the feeding device. In some embodiments, upon completing food service to a pet, the opened bowl-shaped pod is placed in the pod collection and disposal tank. For example, in some embodiments, a weight sensor or other object sensor determines that a pet has finished consuming food from an opened and dispensed bowl-shaped pod in the service area, and the pet feeding device next disposes of the used bowl-shaped pod, into the pod collection and disposal tank. For example, in some embodiments, the pet feeding device includes computer hardware and software, configured to open a trap door at the base of the service area, which opens onto, and drops the used bowl-shaped pod into a chute leading into the pod collection and disposal tank. In some embodiments, such a pod collection and disposal tank includes walls or other guides complementary in shape and size to the bowl-shaped pod, such that pods so released into it tend to nest and stack vertically, much as they may be nested and stacked prior to dispensing, in the upper, storage magazine.

In some embodiments, the trap door, chute and/or disposal tank may include an air-tight sealing mechanism (e.g., including an O-ring about the trap door, which is driven by a servo-motor or other actuator). Thus, in some such embodiments, an airlock is created, preventing odors and vermin, respectively, from leaving and entering the disposal tank.

In some embodiments, the pet feeding device includes a control system, comprising specialized computer hardware and software, configured for controlling one or more input and output devices and communicatively connected with a remote computer system, under the control of an administrative user, such as a pet owner. Among other things, in some embodiments, the pet feeding device may also include timers and/or sensors, communicatively connected with the control system of the pet feeding device, and enabling the pet feeding device to release a freshly opened bowl-shaped pod into the service area at a pre-determined meal time, and/or discard of the used bowl-shaped pod at an appropriate time (e.g., at a time 10, 20, 30, 40 or 50 minutes, or 1, 2, or 3 hours after the bowl-shaped pod is served, and/or another interval after the pet begins or ceases consuming food at the service area.) For example, in some such embodiments, the pet feeding device may open, serve and/or dispose of the bowl-shaped pod in accordance with a pre-programmed feeding schedule (e.g., daily or weekly times for taking such opening, serving and/or disposing actions), instead of, or in addition to, determining that the pet is present and/or has finished consuming the pet food within the bowl-shaped pod being served, as discussed above. In some embodiments, such a feeding schedule may be determined by a user (e.g., a pet parent) through a graphical user interface ("GUI") of the pet feeding device, and/or an App and connected computing device, such as a smartphone or other personal digital assistant ("PDA"). In some such embodiments, such a feeding schedule may include settings determined with the aid of a neural network, trained on data related to use of the pet feeding device.

Although the example of a bowl-shaped pod has been provided, it should be understood that a wide variety of other food container types and shapes may also, or alternatively, be implemented, and fall within the scope of the inventions, the example of a bowl-shape being only illustrative. For example, in some embodiments, the pods may have a dish shape, or other plate shape (e.g., with a raised lip, and headspace area created thereby). As another example, in some embodiments, the pods may have a cup shape (e.g., with the walls of the cup creating the upper void/headspace area). As another example, in some embodiments, the pods may have a saucer shape (e.g., with saucer walls creating the upper void/headspace area). As another example, in some embodiments, the pods may have a dish shape (e.g., with a raised lip at the periphery, and headspace area created thereby). As another example, in some embodiments, the pods may have a platter shape (e.g., with a raised lip at the periphery, and headspace area created thereby). And, in some embodiments, the pods may have an alternative shape similar to any type of food container known in the art (e.g., any known cat food containers).

It should also be noted that, in some embodiments, the pods include a proprietary form factor (e.g., of its outer housing), which interfaces exclusively with the pod-holding magazine, or another storage, service, disposal or disposal related housing or interface of the pet feeding device. However, in some embodiments, conventional, or, at least, more similar to conventional, cat food cans or containers may be used, in place of the bowl-shaped or other pods set forth herein, in a system otherwise similar to that disclosed herein.

In some embodiments, the pet feeding device and/or a storage area of thereof includes a refrigeration device. And, in some embodiments, multiple service areas and/or pod-holding cradles are included, allowing for feeding multiple cats, or other pet animals.

Canons of Construction

Where any term having multiple possible meanings, based on a reasonable interpretation, is set forth in a sentence, clause or other statement (a "statement") in this application, this application should be read as if each such reasonably possible meaning, significance and/or sense of each and every such term and statement is separately, conjunctively and alternatively set forth in additional alternative statement(s) thereafter.

It should also be understood that, for convenience and readability, this application may set forth particular pronouns and other linguistic qualifiers of various specific gender and number, but, where this occurs, this application should be read as if each other gender and number is separately, conjunctively and alternatively set forth in additional alternative statement(s) thereafter.

The embodiments set forth in detail in this application are to ease the reader's understanding of inventions set forth herein and, as such, are only examples of the virtually innumerable alternative embodiments falling within the scope of the application. No specific embodiment set forth in this application should be read as limiting the scope of any claimed inventions; the inventions of the present application are not limited to any particular preferred embodiment disclosed.

These and other aspects of the invention will be made clearer below, in other parts of this application. This Summary, the Abstract, and other parts of the application, are for ease of understanding only, and no part of this application should be read to limit the scope of the invention, whether or not it references matter also set forth in any other part.

BRIEF DESCRIPTION OF THE DRAWINGS

The features and advantages of example embodiments of the invention presented herein will become more apparent from the detailed description set forth below when taken in conjunction with the following drawings.

DETAILED DESCRIPTION OF THE INVENTION

Figure 1:
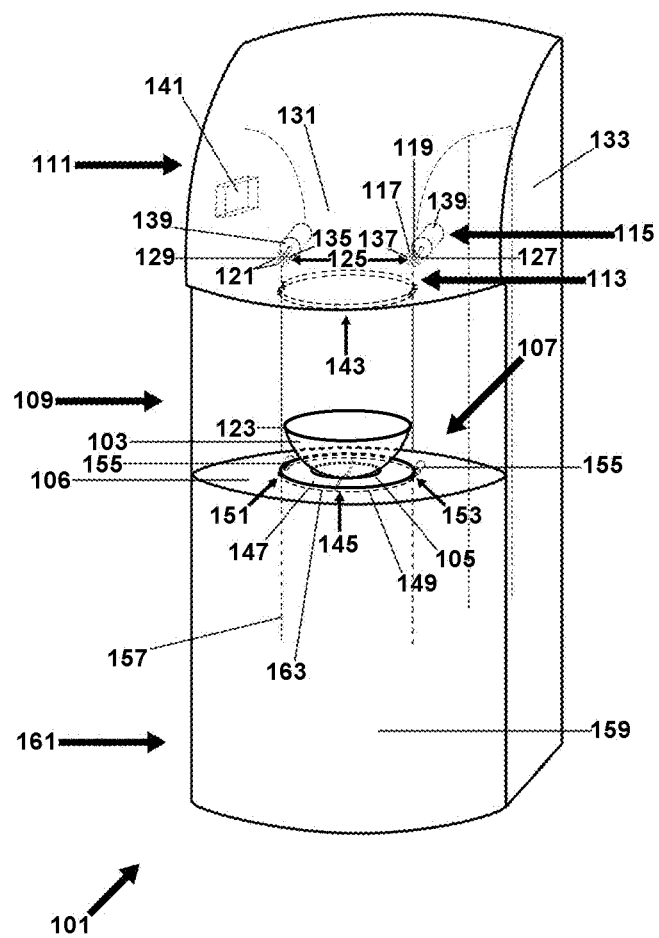
FIG. 1 is a perspective drawing of an example pet feeding device, in accordance with some embodiments of the present application.

The features and advantages of example embodiments of the invention presented herein are directed to new forms of pet food feeding devices, capable of storing and dispensing new forms of pet food containing bowl-shaped pods, and methods for their use, which are now described herein. These and other aspects will become more apparent from the detailed description set forth below when taken in conjunction with the drawings. This description is not intended to limit the application to the embodiments presented herein, which are only examples of the virtually unlimited possible embodiments falling within the scope of the present application. In fact, after reading the following description, it will be apparent to one skilled in the relevant art(s) how to implement the following example embodiments in alternative embodiments, including any possible order, number or other arrangement of components and subcomponents (the following orders, components, subcomponents and/or relationships being non-limiting).

Embodiments of fire-containing furniture, and methods for their use in accordance with some aspects set forth in this Specification are depicted in FIGS. 1 through 6. The following is a list of defined components and/or aspects and reference numbers therefor, as used throughout the figures:

| Reference No. | Component |
| --- | --- |
| 101 | pet feeding device |
| 103 | bowl-shaped pod |
| 105 | rounded cradle |
| 106 | service shelf |
| 107 | service area |
| 109 | mid-section (of pet feeding device 101) |
| 110 | storage area |
| 111 | upper section (of pet feeding device 101) |
| 113 | dispenser |
| 115 | dropper |
| 117 | gear |
| 119 | central axel |
| 121 | teeth (of gear 117) |
| 123 | lip or edge (of bowl-shaped pod 103) |
| 125 | multiple gears |
| 127 | right-hand side gear |
| 129 | left-hand side gear |
| 131 | dispenser funnel |
| 133 | storage area |
| 135 | left horizontal tooth (of gear 117) |
| 137 | right horizontal tooth (of other gear) |

| Reference No. | Component |
| --- | --- |
| 139 | rotary motors (driving gears) |
| 141 | control unit |
| 143 | dispensing bay exit |
| 145 | trap door |
| 147 | left-side trap door leaf |
| 149 | right-side trap door leaf |
| 151 | left-side rotary trap door hinge |
| 153 | right-side rotary trap door hinge |
| 155 | trap door hinge motors |
| 157 | disposal chute |
| 159 | pod collection and disposal tank |
| 161 | lower section (of pet feeding device 101) |
| 163 | O-ring seal |
| 201 | bowl-shaped pod (filled) |
| 203 | stored, uneaten pet food |
| 205 | airtight top-seal |
| 207 | ply(ies) of seal material |
| 209 | headspace area |
| 211 | proprietary internal form factor |
| 213 | lateral slicing area |
| 301 | bowl-shaped pod (more greatly filled) |
| 303 | greater amount of pet food |
| 309 | smaller amount of headspace |
| 400 | control system |
| 401 | input/output device |
| 403 | memory device |
| 405 | long-term data storage device |
| 407 | processor(s) |
| 409 | Internet server(s) |
| 411 | local machine(s) |
| 413 | cameras and microphones |
| 414 | sensor(s) |
| 415 | ubiquitous computing devices |
| 417 | application programming interface |
| 418 | scanner |
| 419 | pet feeding device |
| 420 | PDA |
| 500 et seq. | example method steps |
| 601 | pet feeding device (additional embodiment) |
| 603 | feeder-mounted graphical display |
| 605 | expanded format (of pet feeding device 601) |
| 607 | laterally enlarged bowl-shaped pod storage area |
| 609 | stack of unopened bowl-shaped pods |
| 611 | magazine |
| 613 | spring and/or other form of force biasing |
| 615 | (upward) force-indicating arrow |
| 617 | top-most bowl-shaped pod |
| 618 | curved or angled ceiling |
| 619 | conveyer belt |
| 621 | lateral motion arrow |
| 623 | plurality of empty bowl-shaped pods |
| 625 | especially compact stack (of bowl-shaped pods 623) |
| 641 | control unit (of pet feeding device 601) |
| 659 | disposal tank |
| 701 | pet feeding device (additional embodiment) |
| 707 | bowl-shaped pod storage area |
| 709 | stack of unopened bowl-shaped pods |
| 711 | magazine |
| 713 | spring and/or other form of force biasing |
| 715 | force-indicating arrow |
| 717 | top-most bowl-shaped pod |
| 718 | curved or angled ceiling |
| 721 | lateral motion arrow |
| 723 | plurality of empty bowl-shaped pods |
| 725 | compact stack of empty bowl-shaped pods |
| 731 | dispenser funnel |
| 741 | control unit |
| 759 | disposal tank |
| 771 | plurality of more completely inset cradles |
| 773 | newly opened bowl-shaped pods |
| 775 | service area |
| 777 | mid-section (of pet feeding device 701) |
| 779 | left-side newly opened bowl-shaped pod |
| 781 | angled landing ramp |
| 783 | right-side newly opened bowl-shaped pod |
| 785 | second angled landing ramp |
| 787 | trap door |
| 789 | trap door (second) |

FIG. 1 is a perspective drawing of an example pet feeding device 101, in accordance with some embodiments of the present application. As pictured, in some embodiments, such a pet feeding device stores and dispenses one or more pet food containing bowl-shaped pods, such as the example shown as opened bowl-shaped pod 103, shown held by a rounded cradle 105 of a service shelf 106 within a service area 107, which may be located on or about a mid-section 109 of the pet feeding device 101, as pictured. As will be discussed in greater detail below, in some embodiments, such bowl-shaped pods are dispensed from a storage area 110, which is at least partially disposed within an upper section 111 of the pet feeding device 101, in some such embodiments. In some embodiments, the rounded cradle, catches and holds the bowl-shaped pod 103 when dropped into it by a dispenser 113 within the upper section 111 the feeding device.

In some embodiments, the dispenser may include a dropper 115 including one or more gears, such as example gear 117 rotatably mounted on a central axel 119, for example, as pictured. In some embodiments, such a gear includes teeth, such as the examples shown as teeth 121, which interface with a complementary lip or edge 123 of the bowl-shaped pod 103. In some such embodiments, multiple gears 125, including a right-hand side gear 127 and a left-hand side gear 129, are included, which counter-rotate to drop such a bowl-shaped pod from a dispenser funnel 131, into which such bowl-shaped pods are fed from a storage area, such as example storage area 133. In some embodiments, storage area 133 may include a stack of similar bowl-shaped pods, which nest together, as will be discussed in greater detail below. In some such embodiments, such a stack of similar bowl-shaped pods may include a top-most bowl-shaped pod (not pictured in the present figure, but similar in form to bowl-shaped pod 103), in some embodiments. And, in some such embodiments, such a top-most bowl-shaped pod may be conveyed laterally (e.g., by a conveyer, also not pictured in the present figure), into dispenser funnel 131, where it is fed downward until an outer lip, such as example complementary lip or edge 123, is engaged by horizontal teeth 135 and 137 of gears 125, and held in place directly above service area 107.

Because, in some embodiments, the axels of each of gears 125 are driven by rotary motors 139, which are powered and controlled by a control unit including computer hardware and software (such as example control unit 141), gears 125 can be counter-rotated by the control unit 141 to drop one or more bowl-shaped pods into the service area 107, at the election of a user and/or the control system. More specifically, in some such embodiments, right-hand side gear 127 may be driven counter-clockwise while left-hand side gear 129 is driven in a clockwise rotary direction, each until one of its teeth engaged with lip 135 of the bowl-shaped pod is disengaged from the lip, releasing the bowl-shaped pod downward, through a dispensing bay exit 143. More detailed examples of such a control unit including computer hardware and software are provided below, in reference to FIG. 4.

As discussed above, in some embodiments, once dispensed into service area 107, a bowl-shaped pod is caught by the rounded cradle 105, which catches and holds the bowl-shaped pod 103 when dropped into it by dispenser 113 of the pet feeding device 101. In some embodiments, rounded cradle 105 is formed by a trap door 145, within the service shelf 106. In some embodiments, trap door 145 includes multiple leaves, such as two (2) leaves, shown as example left-side trap door leaf 147 and right-side trap door leaf 149, each of which may be driven by a motorized rotary trap door hinge, shown as example left-side rotary trap door hinge 151 and example right-side rotary trap door hinge 153, respectively. Preferably, two (2) or three (3) or four (4) such leaves are provided. However, as will be readily apparent to those of ordinary skill in the art, less or more trap door leaves, including a single trap door leaf, may be provided, in some embodiments. As with the rotary motors 139, discussed above, each of the motorized rotary trap door hinges discussed above may include a motor, such as one of trap door hinge motors 155, controlled, actuated and/or powered by control unit 141 to drop each such trap door leaf, and drop the bowl-shaped pod 103 into a disposal chute 157, leading into a pod collection and disposal tank 159, located in a lower section 161 of the feeding device 101.

In some embodiments, the trap door, chute and/or disposal tank may include an air-tight sealing mechanism (such as an O-ring seal 163 about the trap door 145). Thus, in some such embodiments, an airlock is created, preventing odors and vermin, respectively, from leaving and/or entering the disposal tank.

In some embodiments, the control unit 141 and/or the pet feeding device may also include timers and/or sensors, connected for power and communications with the control system, and enabling the pet feeding device to release a freshly opened bowl-shaped pod into the service area at a pre-determined meal time, and/or discard of the used bowl-shaped pod at an appropriate time (e.g., at a time 10, 20, 30, 40 or 50 minutes, or 1, 2, or 3 hours after the bowl-shaped pod is served, and/or another interval after the pet begins or ceases consuming food at the service area.) For example, in some such embodiments, the feeding device may open, serve and/or dispose of the bowl-shaped pod in accordance with a pre-programmed schedule (e.g., daily or weekly times for taking such opening, serving and/or disposing actions), instead of, or in addition to, determining that the pet is present and/or has finished consuming the pet food within the bowl-shaped pod being served, as discussed above. More detailed examples of processes which may be carried out by such a control unit including computer hardware and software are provided below, in reference to FIG. 5.

In some embodiments, the pet food dispenser 101 and/or a storage area 133 or pod collection and disposal tank 159 thereof includes a refrigeration device (not pictured). And, in some embodiments, multiple service areas and/or pod-holding cradles are included, allowing for feeding multiple cats, or other pet animals, simultaneously, as will be discussed further below.

It should also be noted that, in some embodiments, pet feeding devices in accordance with aspects of the present application, such as the example pet feeding device 101, may be between ten (10) and sixteen (16) inches in overall height, with the service area located about three (3), four (4) or five (5) inches vertically above the bottom. It should also be noted that, in some embodiments, the bowl-shaped pods may be, or contain food when unopened that is, approximately three (3) ounces in weight. However, in some embodiments, which are preferred, the bowl-shaped pods or pet food contained therein are/is substantially smaller in weight, such as one (1) or (2) ounces.

Figure 2:
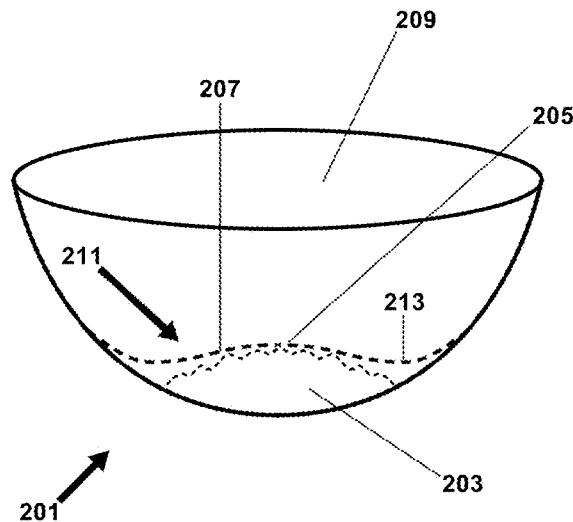
FIG. 2 is a perspective drawing of an example bowl-shaped pod for dispensing fresh food with a pet feeding device, such as the example pet feeding device set forth in reference to FIG. 1, in accordance with some embodiments of the present application.

FIG. 2 is a perspective drawing of an example bowl-shaped pod 201 for dispensing fresh food with a pet feeding device, such as the example pet feeding device set forth in reference to FIG. 1, in accordance with some embodiments of the present application. Unlike the example bowl-shaped pod 103, discussed above in reference to FIG. 1, bowl-shaped pod 201 is shown in an unopened state, prior to being dispensed into a service area of a pet-feeding device, such as example pet feeding device 101, discussed above. As such, bowl-shaped pod 201 contains stored, uneaten pet food 203, and is in a condition conducive to safe, long-term storage of the stored, uneaten pet food 203. For example, in some embodiments, the pet food is sterile (e.g., due to sufficient heating for sterilization) and sealed from external air, in accordance with aspects that will be set forth in greater detail below.

Bowl-shaped pods in accordance with the present application, such as example bowl-shaped pod 201, in some embodiments, are in a particular form related to a small service bowl used in dinnerware, but with modifications to its form and additional aspects in accordance with embodiments of this application, as set forth in greater detail below. In some embodiments, such bowl-shaped pods are partially pre-filled with pet food in a lower, food-containing space of the bowl-shaped pods (e.g., at or about an internal bottom of the bowl-shaped pods). However, in various embodiments, the bowl-shaped pods may be filled to a greater or lesser extent, including pet food present in other space within the bowl-shaped pods, in such embodiments. For example, as pictured, the stored, uneaten pet food 203 fills about one-fifth ($\frac{1}{5}^{th}$) (or less, in some embodiments) of bowl-shaped pod 201. In some such embodiments, the bowl-shaped pods are sealed with an air-tight top-seal 205. In some embodiments, each of the bowl-shaped pods includes one or more ply(ies) of thin metal, plastic, or another sliceable and or peelable sheet material as part of the air-tight top-seal, covering and sealing the lower, food-containing space of the bowl-shaped pods (a "food-sealing ply"). In some such embodiments, the air-tight top-seal may include a ply(ies) of seal material 207 conforming to an upper surface of the pet food. Above the food and seal, in some embodiments, the bowl-shaped pods include a headspace area 209. In some such embodiments, such a headspace 209 of the bowl-shaped pod creates a proprietary internal form factor 211, enabling the bowl-shaped pods to nest with one another, even when filled as discussed above, in a storage stack (such as the stack of unopened bowl-shaped pods 609, discussed below). In some embodiments, such a storage stack is maintained within a fresh bowl-shaped pod magazine, such as that discussed below in reference to FIG. 6, which may release pods within an upper section and/or a wall-facing section, of the feeding device. Several such embodiments will be discussed in greater detail below.

In various embodiments, as discussed above, a pet feeding device opens the air-tight top-seal on a bowl-shaped pod, such as example bowl-shaped pod 201, held within a dispenser funnel, such as example dispenser funnel 131, for example, slicing in a lateral slicing area 213 of bowl-shaped pod 201, which is devoid of food below the food-sealing ply, and opening the bowl-shaped pod 201 and providing access to the pet food, prior to dispensing it for food service by dropping it into the service area. In some embodiments, the food-sealing ply within such a lateral slicing area 213 includes a material including aluminum, or an aluminum alloy, such as those used in conventional canned foods.

However, in some embodiments, such a food-sealing ply and/or material is substantially thinner (e.g., less than or about half the width) of conventional plies of aluminum and other alloys used in conventional canned pet foods. In some embodiments, such a material includes a recyclable material. In some embodiments, a pet feeding device, such as any of the pet feeding devices set forth in this application, includes a bowl-shaped pod opener including a blade slicing open the food-sealing ply (e.g., at the lateral slicing area 213). However, in some such embodiments, such a slicer creates a safe, blunt edge by cutting the ply to create a blunt edge, e.g., through methods known in the art for slicing cans while creating a safe edge where metal plies are sliced. For example, in some embodiments, such a slicer creates such a safe edge by grinding or sanding the edge as it is sliced, to round off sharp edges created by the slicer. As another example, in some embodiments such a slicer folds the edge, making it unexposed, as it slices the ply. However, in some methods, such a safe edge is created by other means known in the art, such as by a peeling device.

Figure 3:
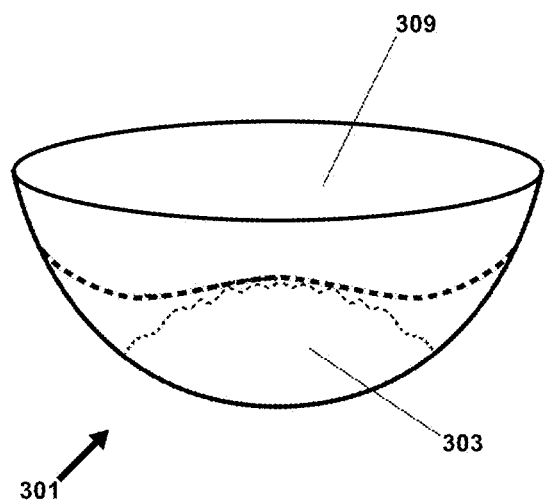
FIG. 3 is a perspective drawing of an alternative embodiment of an example bowl-shaped pod for dispensing fresh food with a pet feeding device, in accordance with some embodiments of the present application.

FIG. 3 is a perspective drawing of an example bowl-shaped pod 301 for dispensing fresh food with a pet feeding device, such as the example pet feeding device set forth in reference to FIG. 1, in accordance with some example embodiments of the present application. In some embodiments, example bowl-shaped pod 301 is similar in nature to, and has similar components as, other bowl-shaped pods set forth in this application, such as example bowl-shaped pod 201 or bowl-shaped pod 103. However, in comparison to bowl-shaped pod 201, bowl-shaped pod 301 includes a greater amount of pet food 303, and a smaller amount of headspace 309. For example, as pictured, the stored, uneaten pet food 303 fills about one-third (⅓rd) or one-half (½) (or less, or more in some embodiments) of bowl-shaped pod 301. Thus, as now illustrated, a wide variety of amounts of food, and volumes taken up thereby, may be provided to a pet using pet feeding device embodiments set forth in the present application, while still carrying out aspects of the invention. Such a wide variety of possible amounts will be readily apparent to those of skill in the art to which the application pertains.

Figure 4:
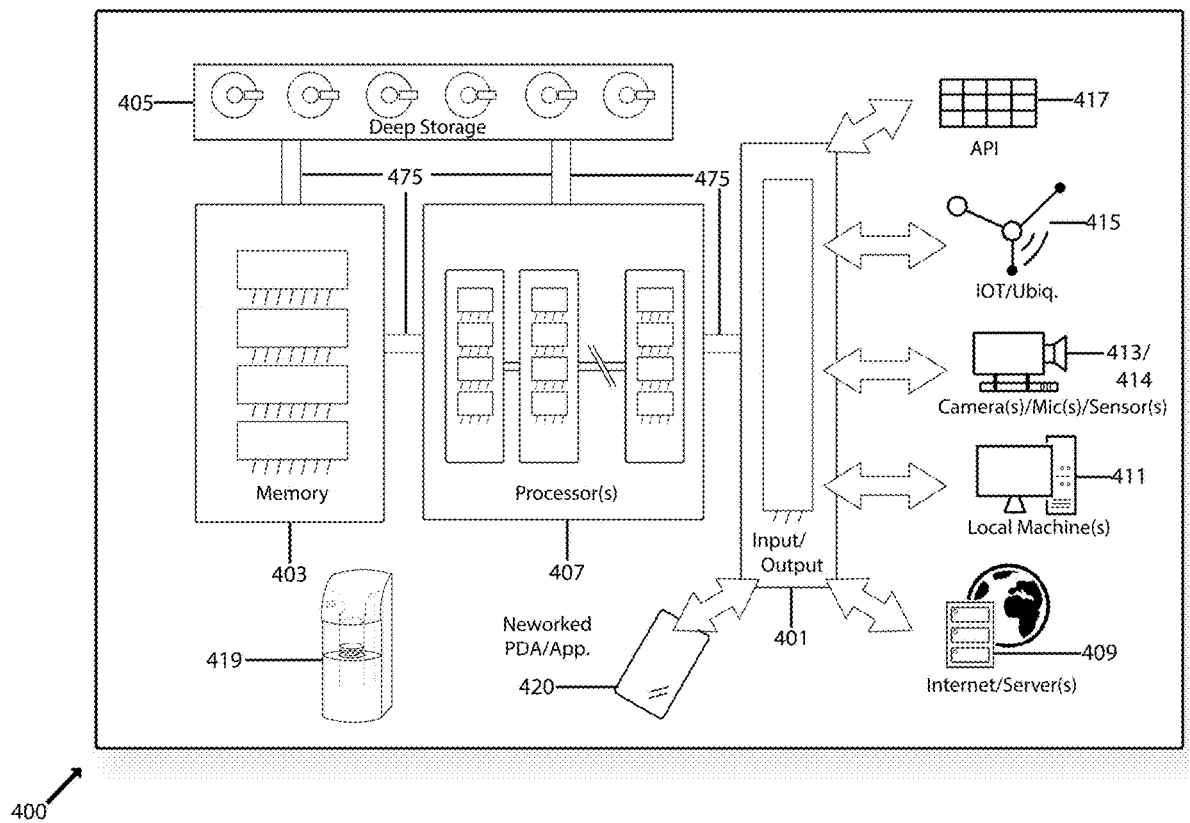
FIG. 4 is a schematic block diagram of some elements of a control system in accordance with some example embodiments of the invention.

FIG. 4 is a schematic block diagram of some elements of a control system 400, including computer hardware and software, in accordance with some example embodiments of the invention. In some example embodiments, the control system incorporates a non-transitory machine-readable medium storing instructions that, when executed by one or more processors, execute various aspects of the present inventions described in this application. The generic and other components and aspects described herein are not exhaustive of the many different systems and variations, including a number of possible hardware aspects that might be used, in accordance with the example embodiments of the invention. Rather, the control system 400 shown depicts some example embodiments.

Control system 400 includes an input/output device 401, a memory device 403, long-term data storage device 405, and processor(s) 407. The processor(s) 407 is/are capable of receiving, interpreting, processing and manipulating signals and executing instructions for further processing and for output, pre-output and/or storage in and outside of the system. The processor(s) 407 may be general or multipurpose, single- or multi-threaded, and may have a single core or several processor cores, including microprocessors. Among other things, the processor(s) 407 is/are capable of processing signals and instructions for the input/output device 401, to cause a user interface to be provided or modified for use by a user on hardware, such as, but not limited to, computer system peripheral devices, such as a mouse, keyboard, touchscreen and/or other display, such as example pet feeding device 419, providing specialized tools (e.g., providing a graphical user interface, a.k.a. a "GUI," providing any of the GUI tools and functions discussed forth in this application, e.g., for managing a pet feeding device, and GUI tools related to the same, as discussed elsewhere in this application). In some embodiments, such GUI tools are based on display-controlling and input-facilitating software (e.g., on local machine(s) 411, a pet feeding device 419 and/or PDA 420).

For example, GUI tools and other user interface aspects, such as any of the graphical "windows," "buttons," and data entry fields, may present via, for example, a display, any number of selections, selectable options, functions, actions, commands and/or data entry fields set forth elsewhere in this application. When such options, actions and/or data entry fields are selected or data is entered by a user (e.g., an administrative user), such selection and/or data entry causes aspects of the control system to command other aspects of the control system to take particular actions and present additional instructions, GUI tools and sub-tools, and/or other guidance to users related to managing a pet feeding device, as set forth in this application. For example, in some embodiments, the control system may determine when and how often to safely and better feed or dose a pet and dispose of bowl-shaped pods, after feeding. The processor(s) 407 may execute instructions stored in memory device 403 and/or long-term data storage device 405, and may communicate via system bus(ses) 475. Input/output device 401 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), a mixing board(s), external hard disk recorder(s), additional movie and/or sound editing system(s) or gear, speaker(s), external filter(s), amp(s), pre-amp(s), equalizer(s), computer display screen(s) or touch screen(s). Such input/output hardware could implement a program or user interface created, in part, by software, permitting the system and user to carry out the user settings and input discussed in this application. Input/output device 401, memory device 403, data storage device 405, and processor(s) 407 are connected and able to send and receive communications, transmissions and instructions via system bus(ses) 475. Data storage device 405 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. In any event, the system may include, or include network connections (e.g., wired, WAN, LAN, 5G, ethernet, satellite, and/or Internet connections) with, any of the example devices or auxiliary devices and/or systems, shown as Internet server(s) 409, local machine(s) 411, cameras and microphones 413, sensor(s) 414, internet of things or other ubiquitous computing devices 415, application programming interface ("API") 417, scanner 418 and PDA 420. Similarly, the control system 400 is capable of accepting input from any of those auxiliary devices and systems, and modifying stored data within them and within itself, based on any input or output sent through input/output device 401.

Input and output devices may deliver their input and receive output by any known means, including, but not limited to, any of the hardware and/or software examples shown as internet server(s) 409, local machine(s) 411, cameras and microphones 413, sensor(s) 414, internet of things or other ubiquitous computing devices 415, API 417, pet-feeding device 419 and PDA 420.

While the illustrated example of a control system 400 in accordance with the present invention may be helpful to understand the implementation of aspects of the invention, any suitable form of computer system known in the art may be used—for example, in some embodiments, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN, satellite communications networks, 5G or other cellular networks, and/or any of the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 5:
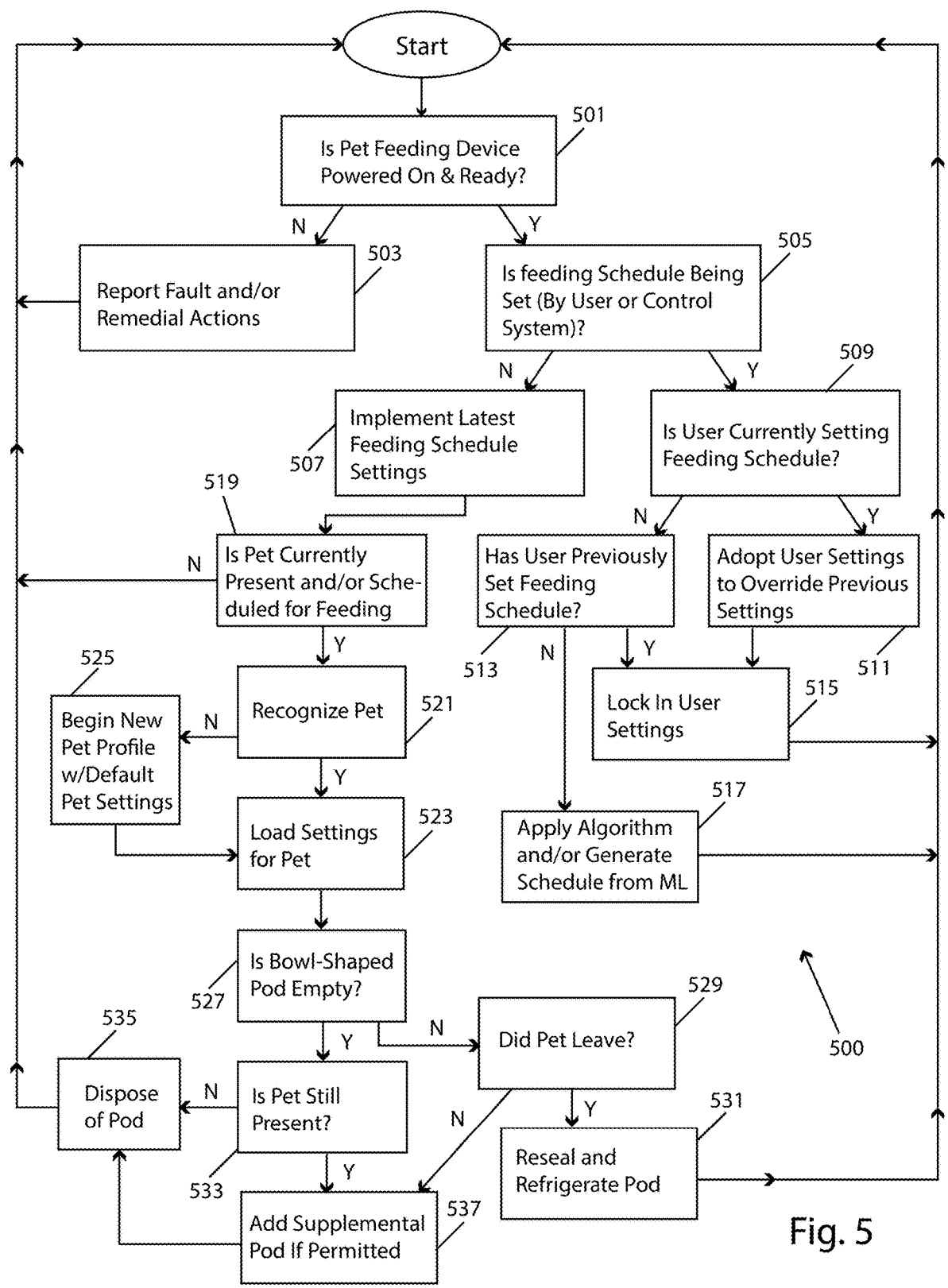
FIG. 5 is a process flow diagram, illustrating several example steps that may be carried out by a control system, such as the example control system set forth in reference to FIG. 4, comprised in, in accordance with some additional embodiments.

FIG. 5 is a process flow diagram, illustrating several example steps that may be carried out by a control system, such as the example control system set forth in reference to FIG. 4, comprised in, or comprising, a pet feeding device, such as any of the pet feeding devices subject to this application, in accordance with some additional embodiments. As discussed above, in some embodiments, a pet feeding device in accordance with aspects of the present application may include such a control system, at least in part, as a local control system, including computer hardware and software, and actuators and sensors, powered by and actuable by the control system.

Beginning with step 501, in some embodiments, the control system first determines if the pet feeding device is powered on and ready to begin dispensing and managing the feeding of a pet, such as a human user's pet domestic cat or dog, in some embodiments. In some embodiments, the pet feeding device may be powered on by an electrical power control and/or a graphical user interface ("GUI"). For example, in some embodiments, such a switch is switchable from and to a powered on state (the "on position") and a powered down or standby state (the "off position" or "standby position," respectively). And, in some embodiments, the pet feeding device is considered ready to dispense and manage such feeding when a sufficient number of unopened bowl-shaped pods (e.g., one) is present in a storage area of the pet feeding device, such that the pet feeding device is able to open and dispense at least one such bowl-shaped pod into a service area of such a pet feeding device, for such a pet to consume pet food therefrom. And, in some embodiments, such a pet feeding device is considered ready to dispense and manage such feeding if, and only if, no obstruction, equipment failure or other fault is determined to exist which would interfere with the proper functioning of the pet feeder in so dispensing the at least one unopened bowl-shaped pod. If such a fault is determined to exist, or if the pet feeding device is determined not to be powered on, the control system proceeds to step 503, in which it reports the existence of the fault to a user (e.g., through a GUI message) and the control system returns to the starting position, in some embodiments. Based on the GUI message, such a user may then remediate such a fault.

If, however, the control system determines that no such fault exists, and that the pet feeding device is powered on and ready to dispense and manage such feeding, the control system proceeds to step 505, in some embodiments, in which it determines whether a feeding schedule is presently being set for the management of feeding one or more pets using the pet feeding device. If not, in some embodiments, the control system proceeds to step 507, in which it proceeds to implement the most recent feeding schedule settings stored in a memory of the control system. Preferably, such a memory is a local memory, on a local control unit of the control system. However, in some embodiments, such a memory may, at least in part, reside on a remote server comprised in, or in communication with, the control system. In some embodiments, such a feeding schedule includes settings for amounts of food and sizes of bowl shaped pods, frequencies of feeding, times to initiate of feeding, durations of feeding, types of food to be dispensed, and whether to provide supplemental feeding of a pet, whether to add additional food to a feeding, whether to dispose of one or more bowl-shaped pods, and other actions to be taken by the control system in the management of feeding one or more pets via such a pet feeding device as those set forth in this application, in accordance with some aspects of the invention(s) set forth in this application.

In some embodiments, such a feeding schedule is being set when a user is manipulating GUI tools for setting such a feeding schedule, as determined in step 509. And, if so, in some embodiments, the control system then proceeds to store such user-created settings, overriding any previous, conflicting settings for one or more pet(s), in step 511. If, however, a feeding schedule is not currently being set, in some embodiments, the control system proceeds to step 513, in which it determines whether the user (e.g., an authorized user who is an owner of a pet) has previously set such a feeding schedule. Following either step 511 or step 513, the control system may proceed to step 515, in which it stores such settings in memory, and may "lock in" such user-created settings, meaning that such user-created settings will override or take precedence over other settings, such as those created by default settings, or by the control system itself, as will be discussed in greater detail below. And the control system may return to the starting position.

However, in some embodiments, if such a feeding schedule is being set, or previously set by a user, the control system itself may alter such settings for one or more pet(s), creating such a feeding schedule, in step 517. For example, in some embodiments, the control system may alter such settings by implementing an algorithm adjusting such a feeding schedule based on data collected by the control system and/or feeding device. And, in some embodiments, the control system may alter such an algorithm through implementation of a neural network based on experience with training data sets (e.g., sets of data gathered through sensors and chronographs during past feedings, such as the length of time a pet spent feeding and an amount of food eaten by a pet, at particular times of day), as will be discussed in greater detail below. The control system may then return to the starting position.

Returning to step 507, discussed above, if the user and/or the control system are not presently altering such settings related to a feeding schedule, the control system implements the latest user-created settings related to a feeding schedule in subsequent actions taken by the control system, as discussed below, in steps 519 et seq.

In subsequent step 519, in some embodiments, the control system proceeds to manage the feeding of one or more pets by first determining whether a pet is present at or about the service area of the pet feeding device. In some embodiments, the control, system may include a proximity sensor and/or camera determining the distance of the pet from the service area and/or the pet feeding device, in some embodiments, and implement a threshold distance to determine that the pet is currently present for feeding. In some embodiments, the control system also, or alternatively, determines whether a scheduled time for feeding a pet has arrived in step 519. If the control system determines that such a pet is present and/or that a scheduled time for feeding a pet has arrived, the control system next proceeds to step 521 in which it proceeds to attempt identification of the pet, in some embodiments. For example, in some embodiments, the control system includes a pet-facing camera or other object recognition sensor (e.g., mounted on and pointing away from the front side of the pet feeding device) and captures an image of the pet, which is then compared to a database of image data associated with pets stored in memory previously. By implementing object recognition and/or image matching algorithms, the control system may then identify the pet, and associate the pet with stored pet profile data, in some embodiments, and load settings related to the pet, in step 523. In some embodiments, as discussed above, such settings include a feeding schedule specific to that unique pet so identified by the control system.

In some embodiments, if the pet is not recognized by the control system, in step 521, the control system automatically begins a new pet profile for the pet, in step 525, and stores new settings related to that pet (although the control system may begin such a profile with default settings, in some embodiments). The control system may then also proceed to step 523 to load the settings related to the pet, and begin feeding the pet by dispensing one or more bowl-shaped pods, if permitted or appropriate, into a service area of the pet feeding device.

Next, using a scale included in the control system, or other object sensor, the control system may determine if a pet has emptied one or more bowl-shaped pods that have been dispensed into a service area of the pet feeding device, in step 527. For example, by comparing the weight of the bowl-shaped pods with stored data related to empty bowl-shaped pods (with no food present within the bowl-shaped pods), the control system may determine whether food remains in such bowl-shaped pods using a weight sensor (e.g., a scale) as discussed above. In some embodiments, if the pet has not emptied the one or more bowl-shaped pods, the control system may proceed to step 529, in which it determines whether the pet has left the feeding device (e.g., by determining that the pet is no longer within the threshold distance from the pet feeding device, as discussed above, in some such embodiments). And, if the pet has left the area, notwithstanding that the one or more bowl-shaped pods has not been emptied, the control system may then proceed to step 531, in which it may reseal the bowl-shaped pod and/or refrigerate it (using a lid fastening device and/or refrigeration sub-device of the pet feeding device, in some embodiments). In some embodiments, the control system refrigerates such a bowl-shaped pod within a sealed disposal tank, such as any of the disposal tanks for such a pet feeding device, as set forth above.

If, however, at step 527, the control system determines that the one or more bowl-shaped pods dispensed in the service area of the pet feeding device have been emptied, it may proceed to step 533, in which it determines whether the pet is still present at or about the pet feeding device (again, implementing a proximity sensor and threshold distance, as discussed above). And, if not, the control system may proceed to dispose of the one or more bowl-shaped pods (e.g., into a sealed disposal tank, as discussed above) in step 535. If the pet is still determined to be present, notwithstanding that the one or more bowl-shaped pods has been determined to be substantially empty, the control system may engage in additional, supplemental feeding, in step 537, by dispensing an additional bowl-shaped pod (in some embodiments, after first dropping the emptied bowl-shaped pod into a disposal tank, as discussed above, although more than one bowl shaped pod may be dispensed simultaneously, in some other embodiments, as discussed below).

As noted above, in some embodiments, such supplemental feeding and additional pods may be dispensed simultaneously, for example, if the pet feeding device includes more than one cradle within its service area. Generally speaking, in some such embodiments, it is preferred that the amount of food within each unopened bowl-shaped pod is a lesser amount of wet food than is present in conventional large wet food cans for pets (which conventional large wet food cans contain five and one-half (5.5) ounces of food, for cats). And, in some such embodiments, it is especially preferred that the amount of food within each unopened bowl-shaped pod is a lesser amount of wet food than is present in conventional small wet food cans for pets (which conventional small wet food cans contain three (3) ounces of wet food, for cats). And, in some embodiments, food within each unopened bowl-shaped pod is a substantially lesser amount than conventional small wet food cans. For example, in some embodiments, food within each unopened bowl-shaped pod is less than two (2) ounces or, in some such embodiments, one (1) ounce in food weight. Thus, in some such embodiments, customized meal sizes may be created with a high degree of adjustability than with conventional wet food feeding cans, by the user and/or system specifying more or less bowl-shaped pods be deployed for a particular pet within a feeding schedule, as discussed above.

As mentioned above, in some embodiments, the control system stores data related to feedings of pets, and adjusts feeding schedules and actions based on those data. In some such embodiments, such logs of feeding data and actions are stored locally, on a local control unit of the pet feeding device including or included within the control system. It should also be noted that, although, in some embodiments as set forth above, the control system implements a feeding schedule and various actions in accordance with such logs, in some embodiments a user may use a GUI, e.g., on a smartphone or other personal digital assistant ("PDA")

connected with the control system, to direct the pet feeding device to dispense one or more bowl-shaped pods for a pet immediately. In some embodiments, such logs include data concerning how long it took for the pet to consume the food dispensed during a feeding. And, in some embodiments, such logs include data concerning how much food remained in the bowl-shaped pod when an allotted eating duration had elapsed. In some embodiments, the pet feeding device disposes of a bowl-shaped pod when such an allotted eating duration has elapsed (e.g., after one (1), two (2) hours or a half (½) hour, in various embodiments). In some embodiments, a deviation from a history of eating times, durations and amounts of food eaten, may also be recorded in the logs and may be used to determine information related to the pet's health.

In some such embodiments, a front-facing camera, such as that discussed above, is included within the control system and pet feeding device, and a user (such as a pet parent) may access such a camera through such a PDA, and view whether a pet is present near the pet feeding device, and then dispense one or more bowl-shaped pods for the pet, based on viewing the pet near the pet feeding device.

Figure 6:
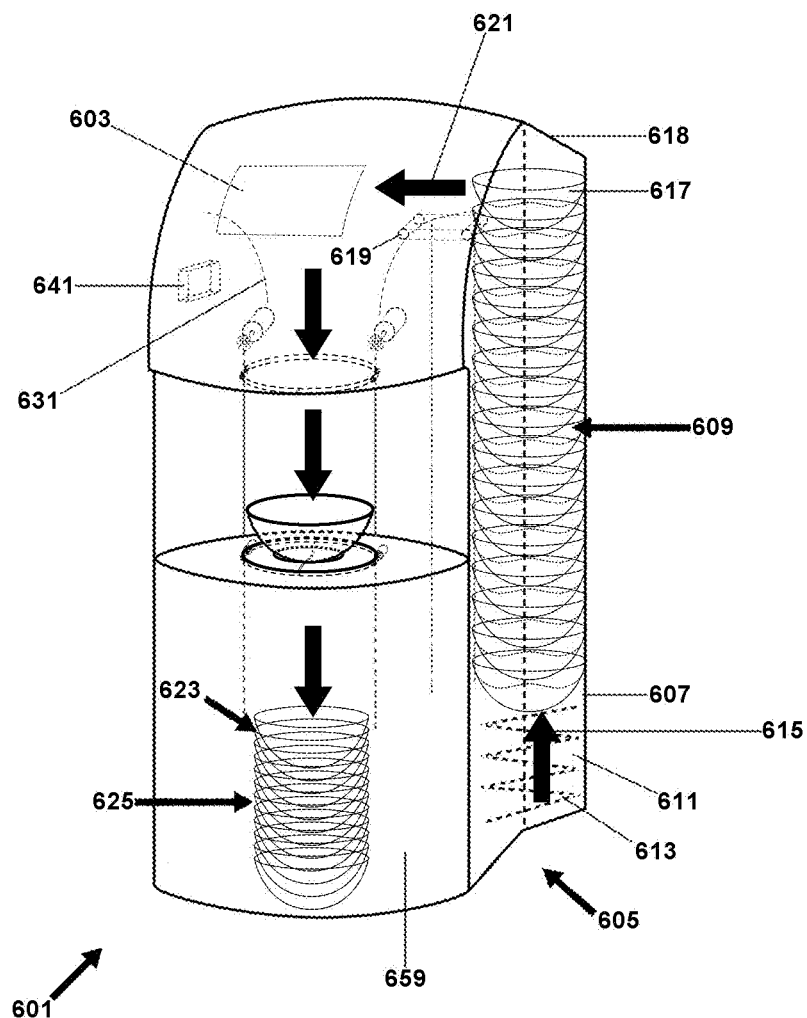
FIG. 6 is a perspective drawing of an example pet feeding device, similar in nature to the pet feeding device set forth above, in reference to FIG. 1, but also setting forth additional aspects, in accordance with some embodiments of the present application.

FIG. 6 is a perspective drawing of an example pet feeding device 601, similar in nature to the pet feeding device set forth above, in reference to FIG. 1, but also setting forth additional aspects, in accordance with some embodiments of the present application. In addition to other example aspects of example pet feeding devices set forth in the present application, pet feeding device 600 also includes a feeder-mounted graphical display 603, which may be powered by and communicatively connected with the control unit 641, which may be the same as or similar in nature to the example control unit 141 and the control system set forth in reference to FIG. 4, provided above, in some embodiments. Using graphical user interfaces generated by the control unit and timer features of the pet feeding device, a human user (such as a pet owner) may set feeding times and schedules, and adjust other settings for the operation of the pet feeding device 601. In some embodiments, however, a user may adjust such settings using an additional peripheral device, which may be wirelessly connected (e.g., via Bluetooth, WiFi and/or the Internet) to the control unit, in some such embodiments.

As also can be seen in the present figure, pet feeding device 601 has a larger, expanded format 605, in comparison to that pictured for example pet feeding device 101, discussed above. More specifically, a laterally enlarged bowl-shaped pod storage area 607 is provided, including a stack of unopened bowl-shaped pods 609. In some embodiments, the stack of unopened bowl-shaped pods 609 are held within a magazine 611 within the bowl-shaped pod storage area 607. In some such embodiments, magazine 611 includes a spring and/or other form of force biasing 613. In some such embodiments, spring and/or other form of force biasing 613 tends to push stack of unopened bowl-shaped pods 609 upwards, as shown by example force-indicating arrow 615. As a result, in some embodiments, a top-most bowl-shaped pod 617 is forced into a curved or angled ceiling 618, causing it to be pushed laterally, and onto a conveyor belt 619, which then moves the top-most bowl-shaped pod toward a dispenser funnel 631, which is the same as or similar in nature to the dispenser funnel 131, discussed above, in some such embodiments—as shown by example lateral motion arrow 621. From that point, such a bowl-shaped pod may then be dropped into a service area for feeding, and then into a (for example, sealed) disposal tank, in accordance with aspects set forth above, in reference to pet feeding device 101. It should be noted that a plurality of empty bowl-shaped pods 623 are shown in an especially compact stack 625 within the disposal tank 659 (which may be similar in nature to disposal tank 159, discussed above), even more fully nested than when partially filled with food, as in stack of unopened bowl-shaped pods 609.

Figure 7:
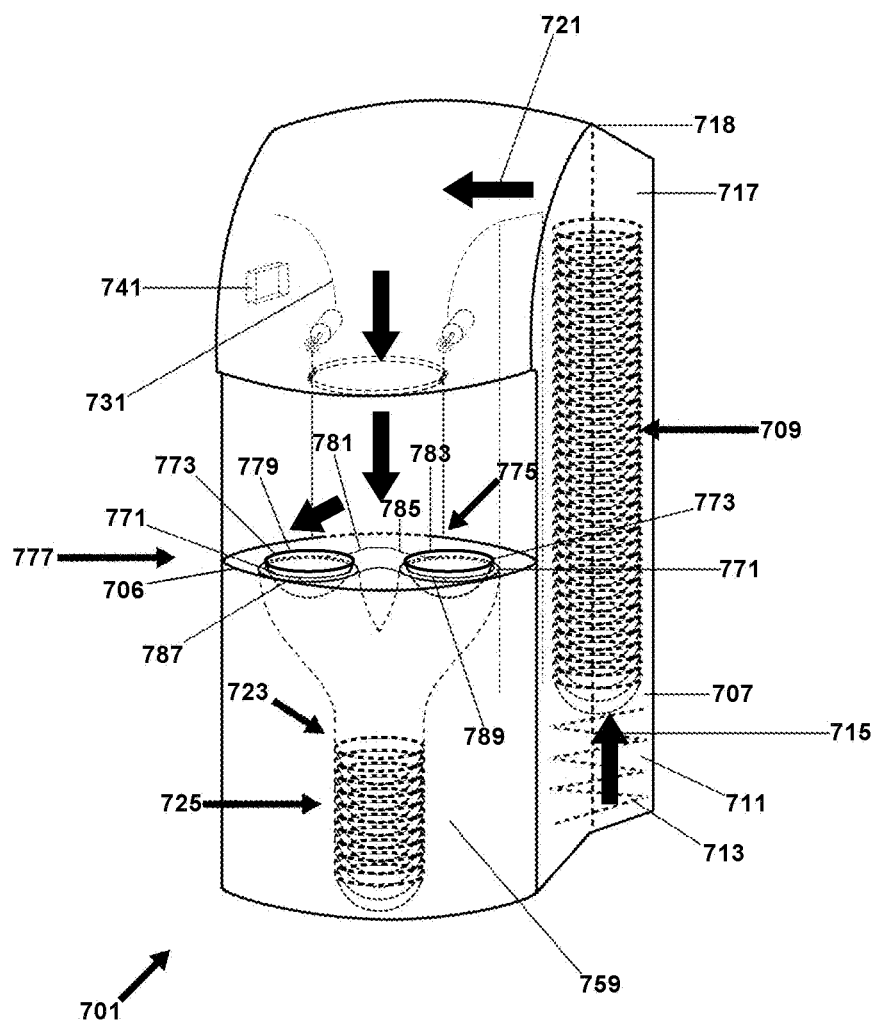
FIG. 7 is a perspective drawing of another example pet feeding device, similar in nature to the pet feeding devices set forth above, in reference to FIGS. 1 and 6, but also setting forth additional aspects, in accordance with some embodiments of the present application.

FIG. 7 is a perspective drawing of another example pet feeding device 701, similar in nature to the pet feeding devices set forth above, in reference to FIGS. 1 and 6, but also setting forth additional aspects, in accordance with some embodiments of the present application. As with other embodiments of pet feeding devices set forth in the present application, pet feeding device 701 includes a bowl-shaped pod storage area 707, containing and aligning a stack of unopened bowl-shaped pods 709, held within a magazine 711 within bowl-shaped pod storage area 707, in some embodiments. And, as in such other embodiments, a spring and/or other form of force biasing 713 tends to push the stack of unopened bowl-shaped pods 709 upwards, as shown by example force-indicating arrow 715. As a result, in some embodiments, a top-most bowl-shaped pod 717 is forced into a curved or angled ceiling 718, causing it to be pushed laterally, which then moves the top-most bowl-shaped pod toward a dispenser funnel 731, which is the same as or similar in nature to the dispenser funnel 131, discussed above, in some such embodiments—as shown by example lateral motion arrow 721. Also pictured are a plurality of empty bowl-shaped pods 723 are shown in an especially compact stack 725 within the disposal tank 759 (which may be similar in nature to disposal tank 159 and disposal tank 659, discussed above), even more fully nested than when partially filled with food, as in stack of unopened bowl-shaped pods 709.

However, rather than a single rounded cradle, a plurality of more completely inset cradles 771 (holding almost all of two example newly opened bowl-shaped pods 773, within a service shelf 706 within a service area 775, are provided on or about a mid-section 777 of the feeding device 701, as pictured. When dropped, seriatim, from dispenser funnel 731, a first-dropped one of the newly opened bowl-shaped pods 773 (namely, left-side newly opened bowl-shaped pod 779), is moved leftward by gravity along an angled landing ramp 781. Next, when a second dropped one of the newly opened bowl-shaped pods 773 (namely, right-side newly opened bowl-shaped pod 783) lands on landing ramp 781, it collides with the edge of the first dropped one of the newly opened bowl-shaped pods 773, and is forced rightward, instead, along a slightly shorter, second angled landing ramp 785, and is then instead moved rightward by gravity along the second angled landing ramp 785. In some embodiments, as discussed above, for example, in reference to FIG. 5, above, a control unit 741, which may include or be included within a control system including computer hardware and software (such as the example control system set forth above, in reference to FIG. 4), determines whether to dispense one, or a plurality of bowl-shaped pods, based on an identified pet's consumption history, in some embodiments. Each the plurality of more completely inset cradles 771 may each include a trap door, such as example trap door 787 and example trap door 789, respectively, each leading into the pod collection and disposal tank 759, via a plurality of merging chutes 791, in some embodiments.

Although the example of a single dispenser and dropping mechanism has been provided in the examples pictured in the present application, it should be noted that, in some embodiments, such a dispenser and dropping mechanism is configured to release said stackable bowl-shaped and sealed containers two-or-more-at-a-time, for example, by including multiple dropping mechanisms (e.g., in a side-by-side configuration).

It should be understood that the above-described components, steps, and number and order of components and steps for the example fire-containing furniture discussed in this application, is only exemplary of certain embodiments set forth in this application, which are not intended to limit the application in any way. In fact, virtually unlimited alternative orders, numbers and instances of the above steps and components, in addition with countless additional and alternative steps, may be used and/or performed, within the scope of the present application and inventions herein, as will be readily apparent to those of skill in the art. Although the example of a metal table has been provided, it should be understood that any suitable alternative form of furniture and components may be used, instead of, or in addition to, such a table, in various embodiments, while carrying out aspects of the present inventions, as will be readily apparent to those of skill in the art.

What is claimed is:

1. A pet feeding device, comprising:
a storage area, configured to hold a vertical stack of unopened stackable bowl-shaped and sealed containers;
an opener, configured to slice and/or peel away a food-sealing ply of material from said bowl-shaped and sealed containers;
a dispenser, located above a service area, comprising a dropping mechanism, configured to release one or more of said stackable bowl-shaped and sealed containers downward, to said service area;
said service area, located at or about a mid-section of said pet feeding device, and located below said dispenser and dropping mechanism;
a storage tank, located below said service area.

2. The pet feeding device of claim 1, wherein the storage area configured to hold a vertical stack of stackable bowl-shaped and sealed containers is located above the service area.

3. The pet feeding device of claim 1, wherein the service area comprises a cradle, configured to variably catch, hold and release one of the stackable bowl-shaped and sealed containers after said one of the stackable bowl-shaped and sealed containers is released into said service area.

4. The pet feeding device of claim 3, wherein the service area is configured to receive said stackable bowl-shaped and sealed containers two-or-more-at-a-time.

5. The pet feeding device of claim 1, wherein the dropping mechanism is configured to release said stackable bowl-shaped and sealed containers one-at-a-time.

6. The pet feeding device of claim 5, comprising a trap door and chute, located below said cradle, and leading into said storage tank.

7. The pet food dispenser of claim 6, comprising an air lock, including an actuable air-tight seal.

8. The pet feeding device of claim 1, wherein the service area comprises a plurality of cradles, located in different positions within said service area, each of said plurality of cradles being configured to variably catch, hold and release a different one of the stackable bowl-shaped and sealed containers after said different one of the stackable bowl-shaped and sealed containers is released into said service area.

9. The pet feeding device of claim 8, comprising multiple trap doors and chutes, located below said cradle, and leading into said storage tank.

10. The pet food dispenser of claim 9, wherein the air-tight seal includes an elastomeric lining, located at least partially on or about said trap door.

11. The pet food dispenser of claim 1, comprising said stackable bowl-shaped and sealed containers, and wherein each of the stackable bowl-shaped and sealed containers comprises an upper void and a lower, food-containing section, covered by said food-sealing ply of material.

12. The pet food dispenser of claim 1, wherein said opener creates a blunt edge when slicing and/or opening said ply of material.

13. The pet food dispenser of claim 1, comprising a control system comprising computer hardware and software.

14. The pet food dispenser of claim 13, wherein the control system is configured to variably set one or more pet feeding schedule(s).

15. The pet food dispenser of claim 14, wherein the control system is configured to set the one or more pet feeding schedules via one or more GUI tools.

16. The pet food dispenser of claim 15, wherein the control system is configured to set the one or more pet feeding schedules based on an algorithm.

17. The pet food dispenser of claim 16, wherein the control system comprises one or more sensors capable of detecting the presence of physical object(s).

18. The pet food dispenser of claim 16, wherein the control system is configured to alter the algorithm based on data gathered by said sensors over time.

19. A system for dispensing food for a pet animal, comprising:
a pet feeding device, comprising:
a control system, comprising specialized computer hardware and software;
a storage area, configured to hold a vertical stack of stackable bowl-shaped and sealed containers;
an opener, powered and/or communicatively connected with said control system, configured to slice and/or peel away a food-sealing ply of material from said bowl-shaped and sealed containers;
a dropping mechanism, located above a service area, powered and/or communicatively connected with said control system, configured to release one or more of said stackable bowl-shaped and sealed containers downward, to said service area;
said service area, located at or about a mid-section of said pet feeding device, and located below said dropping mechanism;
a storage tank, located below said service area.

* * * * *